Nov. 25, 1947.  B. FITZPATRICK  2,431,388
FOLDABLE AXLE TRAILER
Filed May 3, 1946  3 Sheets-Sheet 1
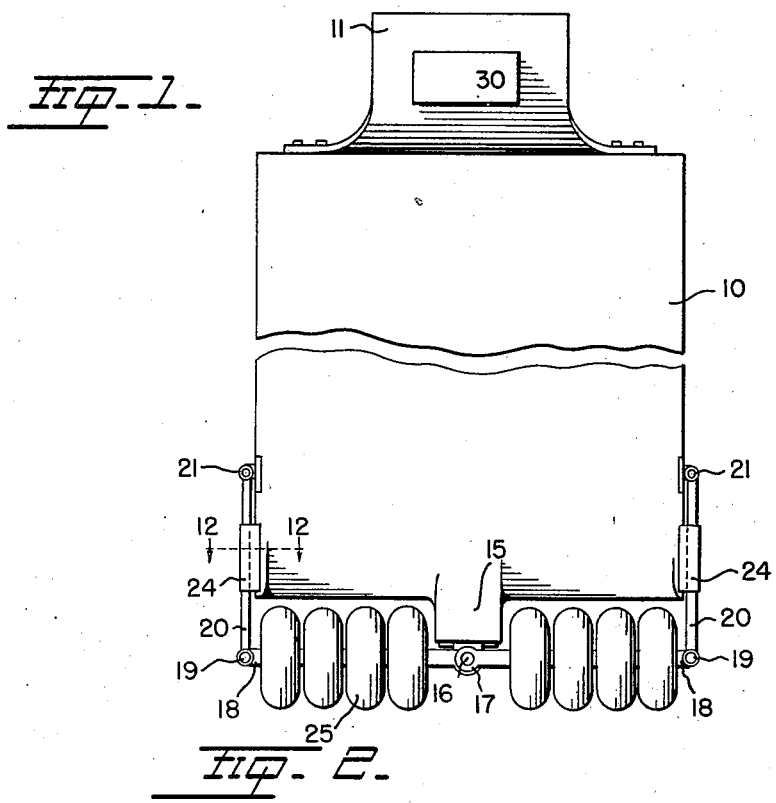
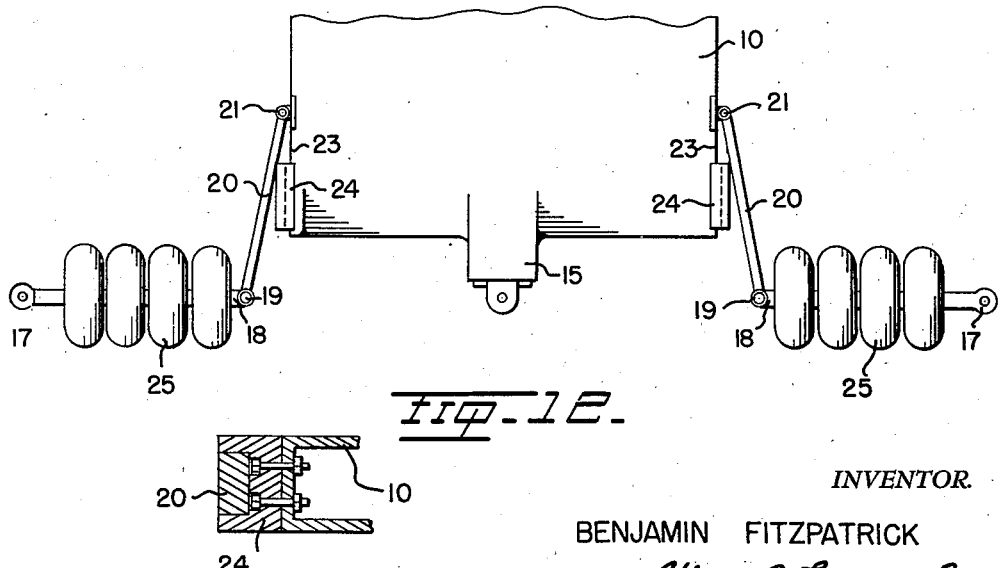
INVENTOR.
BENJAMIN FITZPATRICK
BY Victor J. Evans & Co.
ATTORNEYS

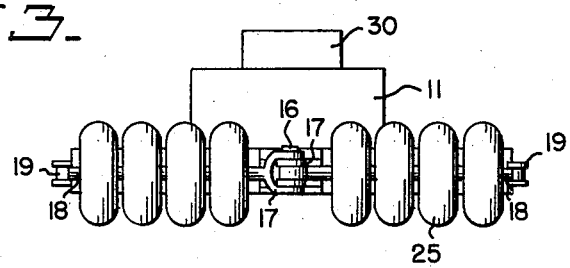
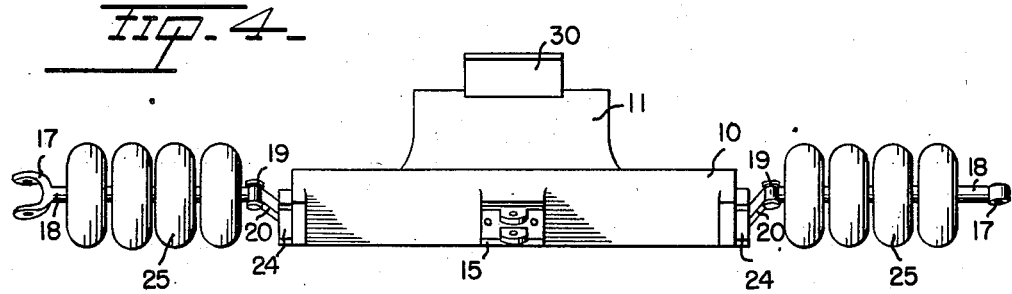
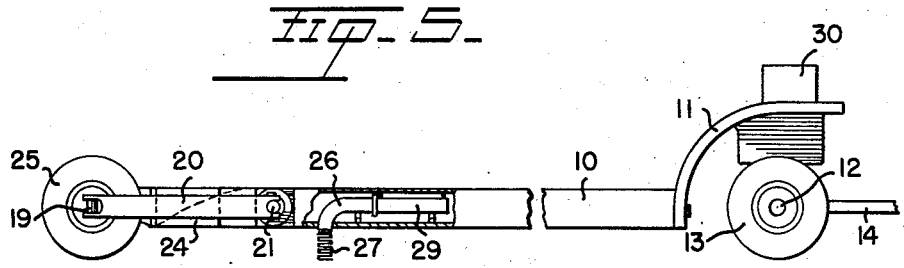
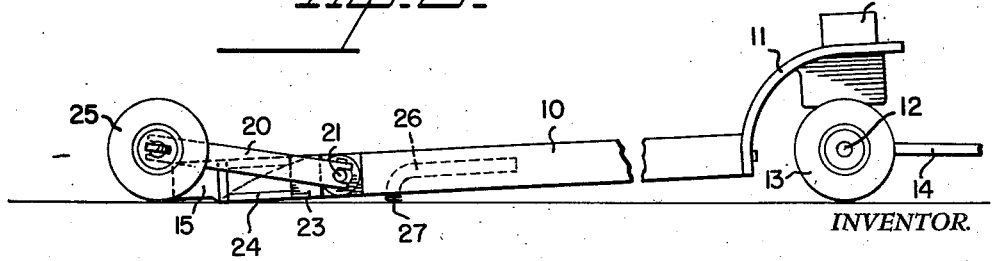

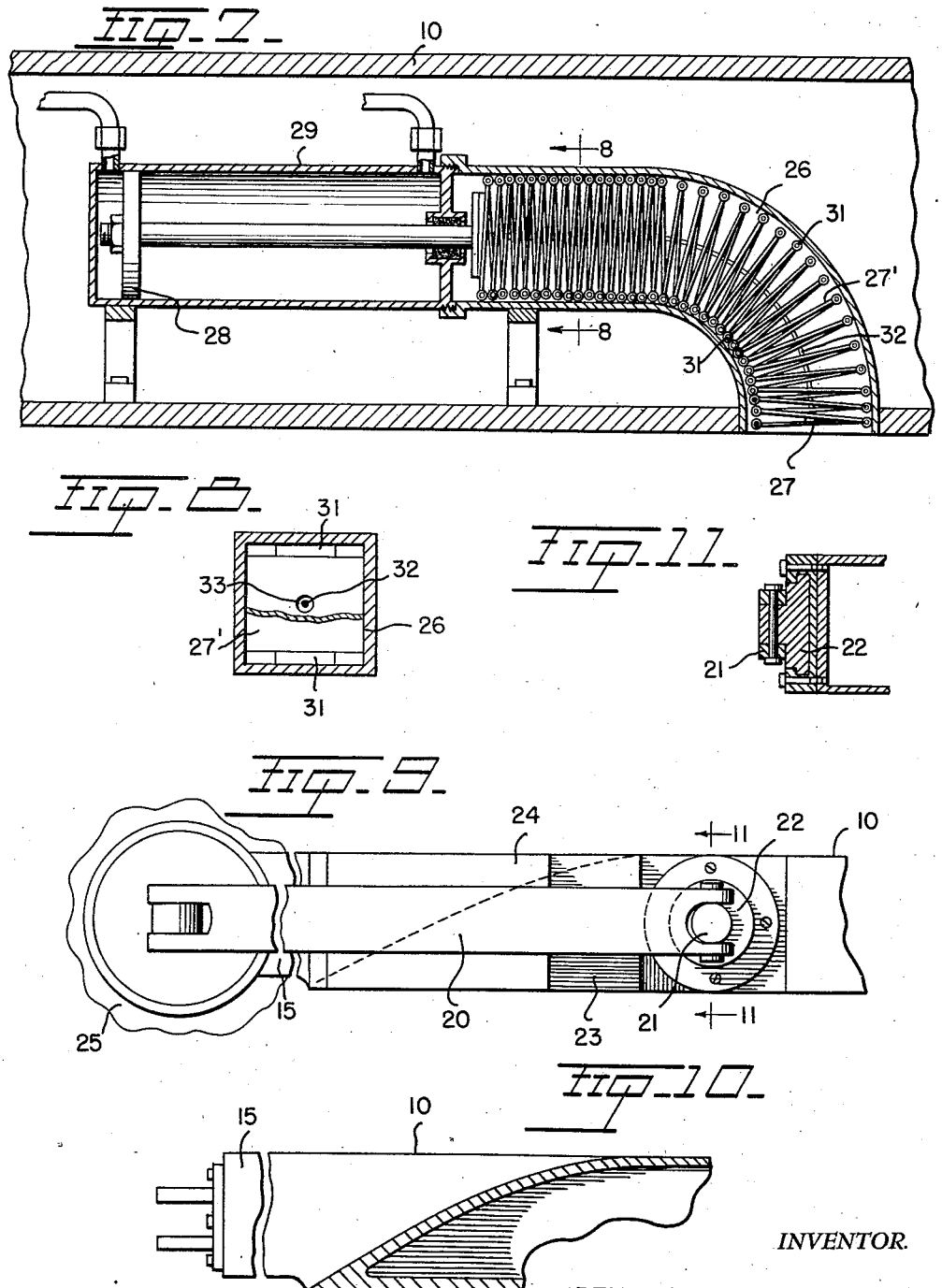

Patented Nov. 25, 1947

2,431,388

UNITED STATES PATENT OFFICE 2,431,388

FOLDABLE AXLE TRAILER

Benjamin Fitzpatrick, Miami, Fla.

Application May 3, 1946, Serial No. 666,916

5 Claims. (Cl. 280—43)

1

The invention relates to a trailer construction, and more especially to a hydraulically lifted and foldable axled trailer.

The primary object of the invention is the provision of a structure of this character, wherein the trucking body thereof is supported on foldable and extensible wheeled axles, so that the said body can be raised and lowered, thereby enabling the convenient loading and unloading operation in the uses of the structure.

Another object of the invention is the provision of a structure of this character, wherein the parts thereof are novel and unique in the arrangement of the same, so that the trailer can be handled with ease and dispatch in the loading and unloading operations thereof, the body of the structure being hydraulically jacked for the raising thereof for the adjustment of the wheeled axles without excessive labor.

A further object of the invention is the provision of a structure of this character, which is simple in construction, thoroughly reliable and efficient in operation, strong, durable, readily and easily adjusted, automatically raised when loaded or not, withstanding a load when in raised position or during travel, possessed of few parts, thus economical in repairs or replacements, its parts being readily accessible, for convenience of manipulation, and inexpensive to manufacture.

With these and other objects in view the invention consists in the features of construction, combination and arrangement of parts as will be hereinafter fully described, illustrated in the accompanying drawings, which disclose the preferred embodiment of the invention, and pointed out in the claims hereunto appended.

In the accompanying drawings:

Figure 1 is a top plan view of the trailer constructed in accordance with the invention.

Figure 2 is a fragmentary view similar to Figure 1 showing the rear wheel axles in an adjusted position.

Figure 3 is a rear elevation with the structure in position shown in Figure 1.

Figure 4 is a view similar to Figure 3 showing the wheeled axles in the position shown in Figure 2.

Figure 5 is a side view, partly broken away, for illustrating details of the jack.

Figure 6 is a view similar to Figure 5 showing the jack in a retracted position.

Figure 7 is an enlarged vertical longitudinal sectional view through the jack.

Figure 8 is a transverse sectional view taken on the line 8—8 of Figure 7, looking in the direction of the arrows.

Figure 9 is a fragmentary enlarged side view of the rear portion of the trailer.

Figure 10 is a vertical central longitudinal sectional view thereof.

2

Figure 11 is a sectional view taken on the line 11—11 of Figure 9 looking in the direction of the arrows.

Figure 12 is a fragmentary sectional view taken on the line 12—12 of Figure 1.

Similar reference characters indicate corresponding parts throughout the several views in the drawings.

Referring to the drawings in detail, the trailer constituting the present invention, comprises a platform body 10, which may be of any required size, preferably rectangular in shape, and in this instance is made in a single unit, yet it may be otherwise constructed, having an upwardly and forwardly curved front end of crosswise reduced size 11. Beneath the end 11 is a front turning axle 12 carrying front wheels 13, and from the hound of this axle 12 is projected a hitch 14 for the coupling of the trailer to a power unit, not shown.

At the rear end of the platform 10, midway of the cross area thereof, is a coupling head 15 which is integral therewith, and in such head is detachably coupled by a pin or the like 16 the eye ends 17 of a pair of horizontally swingable rear axles 18. The axles 18 for horizontal swing are connected by pivots 19 to laterally movable hinging arms 20, which at their hinge 21 are swiveled by mountings 22 to the opposite side edges 23 of the platform 10 inwardly a distance from the rear end thereof.

The side edges 23 between the mountings 22 and the pivots 19 are fitted with channel cleats 24 for removably receiving the arms 20 when brought into such cleats, and thereby holding the said arms against swivel action at the mountings 22. In this fashion the platform 10 is held in a substantially horizontal level supported by the rear wheels 25 and the front wheels 13, respectively, so as to support a load upon the platform and travel of the trailer.

Fixedly located beneath the platform 10 and aft thereof is a hydraulically operated lifting jack 26, it being preferable to employ two of the same, and its lifting proper 27 being in the form of a series of plates 27', which are hingedly connected at their upper and lower ends at 31, and which plates are operated hydraulically by a plunger or piston 28 within a fluid cylinder 29, the fluid being admitted and exhausted to and from the latter through a system, the power unit thereof being generally indicated at 30, and is manually regulated. To prevent displacement of the plates, a cable 32 is connected to the last plate and extending through apertures 33 in the center of the plates is connected to the center of the piston 28 and the cable 32 retains the plates in alignment during the operation thereof.

The purpose of the jack or jacks is to effect the lifting of the platform 10, whether loaded or unloaded, so that the rear wheels with their axles can be uncoupled and shifted from normal position shown in Figures 1 and 3 to Figures 2 and 4, of the drawings, or a reversal thereof. The wheels at the rear end of the platform 10 permit the lowering thereof when such wheels are in the position shown in Figures 2 and 4 of the drawings to that position shown in Figure 6, then when in this position the trailer can be readily loaded with ease and dispatch. Now, when the rear wheels are in the position shown in Figures 1 and 3, the trailer is mobile and can travel from one point to another under power draft thereof.

When the jack or jacks operate for lifting of the rear end of the platform 10, the rear wheels can be coupled and uncoupled and swung to the positions before described in a ready and easy manner, as should be obvious.

What is claimed is:

1. A vehicle of the kind described comprising a wheeled body, laterally shiftable arms swiveled to the body rearmost of the body and aft thereof, axles hinged to the arms for the rearmost wheels to have the same move arcuately toward and away from the body in a broadside direction, means for coupling the axles to the body when swung inwardly next to the rearmost end thereof, and means for holding the arms against swivel movement when the axles are coupled to the said body for maintaining it elevated by the wheels.

2. A vehicle of the kind described, comprising a wheeled body, laterally shiftable arms swiveled to the body rearmost of the body and aft thereof, axles hinged to the arms for the rearmost wheels to have the same move arcuately toward and away from the body in a broadside direction, means for coupling the axles to the body when swung inwardly next to the rearmost end thereof, means for holding the arms against swivel movement when the axles are coupled to the said body for maintaining it elevated by the wheels, and means for jacking the body to an elevated position when the axles are uncoupled therefrom for the shifting of the same laterally away from such body in a broadside direction.

3. A vehicle of the kind described, comprising a wheeled body, laterally shiftable arms swiveled to the body rearmost of the body and aft thereof, axles hinged to the arms for the rearmost wheels to have the same move arcuately toward and away from the body in a broadside direction, means for coupling the axles to the body when swung inwardly next to the rearmost end thereof, means for holding the arms against swivel movement when the axles are coupled to the said body for maintaining it elevated by the wheels, and means for jacking the body to an elevated position when the axles are uncoupled therefrom for the shifting of the same laterally away from such body in a broadside direction and also inwardly for coupling engagement of the axles with the body.

4. A vehicle of the kind described, comprising a wheeled body, laterally shiftable arms swiveled to the body rearmost of the body and aft thereof, axles hinged to the arms for the rearmost wheels to have the same move arcuately toward and away from the body in a broadside direction, means for coupling the axles to the body when swung inwardly next to the rearmost end thereof, means for holding the arms against swivel movement when the axles are coupled to the said body for maintaining it elevated by the wheels, means for jacking the body to an elevated position when the axles are uncoupled therefrom for the shafting of the same laterally away from such body in a broadside direction, and hydraulic operating means for the jack.

5. A vehicle of the kind described, comprising a wheeled body, laterally shiftable arms swiveled to the body rearmost of the body and aft thereof, axles hinged to the arms for the rearmost wheels to have the same move arcuately toward and away from the body in a broadside direction, means for coupling the axles to the body when swung inwardly next to the rearmost end thereof, means for holding the arms against swivel movement when the axles are coupled to the said body for maintaining it elevated by the wheels, means for jacking the body to an elevated position when the axles are uncoupled therefrom for the shifting of the same laterally away from such body in a broadside direction, hydraulic operating means for the jack, and a tensioning prop included with the jack.

BENJAMIN FITZPATRICK.

REFERENCES CITED

The following references are of record in the file of this patent:

FOREIGN PATENTS

| Number | Country | Date |
|---|---|---|
| 33,978 | France | Oct. 23, 1928 |